United States Patent [19]
Minke et al.

[11] Patent Number: 5,537,789
[45] Date of Patent: Jul. 23, 1996

[54] COMPRESSION MOLDED DOOR ASSEMBLY

[75] Inventors: Ronald C. Minke, Fort Wayne; Kenneth J. West, Grabill, both of Ind.

[73] Assignee: Therma-Tru Corp., Sylvania, Ohio

[21] Appl. No.: 274,978

[22] Filed: Jul. 14, 1994

[51] Int. Cl.$^6$ ............................. E04B 2/20; B44F 9/02
[52] U.S. Cl. .................. 52/313; 52/309.9; 52/479; 52/784.15; 264/129; 264/162
[58] Field of Search ................ 52/309.9, 309.11, 52/313, 316, 479, 784.1, 784.15; 264/129, 162

[56] References Cited

U.S. PATENT DOCUMENTS

| | | |
|---|---|---|
| 653,400 | 7/1900 | Rapp . |
| 751,435 | 2/1904 | Ohnstrand . |
| 956,556 | 5/1910 | Wege . |
| 1,183,842 | 5/1916 | Alling . |
| 1,249,814 | 12/1917 | Otte . |
| 2,557,412 | 6/1957 | Clements . |
| 2,849,758 | 9/1958 | Plumley et al. . |
| 2,871,056 | 1/1959 | Levitt . |
| 2,890,977 | 6/1959 | Bayer et al. . |
| 2,924,851 | 2/1960 | Birckhead, Jr. . |
| 2,924,860 | 2/1960 | Parham, Jr. et al. . |
| 2,924,861 | 2/1960 | Viets . |
| 3,153,817 | 10/1964 | Pease, Jr. . |
| 3,177,271 | 4/1965 | Slayman . |
| 3,225,505 | 12/1965 | Lytz . |
| 3,250,041 | 5/1966 | Anger . |
| 3,299,595 | 1/1967 | Munk . |
| 3,402,520 | 9/1968 | Lee . |
| 3,404,502 | 10/1968 | Miller . |
| 3,498,001 | 3/1970 | MacDonald . |
| 3,512,304 | 5/1970 | Meuret . |
| 3,546,841 | 12/1970 | Smith et al. . |
| 3,593,479 | 7/1971 | Hinds . |
| 3,616,116 | 10/1971 | McDonald . |
| 3,772,241 | 11/1973 | Krockel . |
| 3,883,612 | 5/1975 | Pratt et al. . |
| 3,950,894 | 4/1976 | DiMaio . |
| 3,961,012 | 6/1976 | DiMaio . |
| 4,022,644 | 5/1977 | Smith, Jr. . |
| 4,104,828 | 8/1978 | Naslund et al. ............... 52/809 X |
| 4,132,042 | 1/1979 | DiMaio . |
| 4,152,876 | 5/1979 | Seeley . |
| 4,236,365 | 12/1980 | Wheeler . |
| 4,265,067 | 5/1981 | Palmer . |
| 4,311,183 | 1/1982 | Herbst et al. . |
| 4,327,535 | 5/1982 | Governale . |
| 4,374,693 | 2/1983 | Pitt . |
| 4,420,922 | 12/1983 | Wilson . |
| 4,429,493 | 2/1984 | St. Aubin . |
| 4,496,201 | 1/1985 | Allgeyer . |
| 4,546,585 | 10/1985 | Governale . |
| 4,550,540 | 11/1985 | Thorn . |

(List continued on next page.)

FOREIGN PATENT DOCUMENTS

| | | |
|---|---|---|
| 2258510 | 9/1975 | France . |
| 2304763 | 11/1976 | France . |
| 551432 | 5/1977 | U.S.S.R. . |
| 604937 | 4/1978 | U.S.S.R. . |
| 1420244 | 1/1976 | United Kingdom . |
| 1487309 | 9/1977 | United Kingdom . |
| 2044316 | 10/1980 | United Kingdom . |
| 2057037 | 3/1981 | United Kingdom . |

*Primary Examiner*—Wynn E. Wood
*Assistant Examiner*—Kevin D. Wilkens
*Attorney, Agent, or Firm*—Emch, Schaffer, Schaub & Porcello Co.,

[57] ABSTRACT

A door assembly having a core positioned within a frame. The door assembly further includes a pair of opposed molded skins. There are edges adjacent the skins. The skins are made of a polymer material, a low profile additive and reinforcement fibers. Each of the skins has an exterior surface and an interior surface. The interior surface is adjacent the core. The exterior surface includes a textured pattern consisting of level portions and depressions. The depressions have a range in depth from about 0.025 mm to about 1.0 mm from the level portions. The skins further include undercuts adjacent the depressions. The undercuts have a range in extent of undercutting from about 0.025 mm to about 0.10 mm from the depressions.

15 Claims, 2 Drawing Sheets

U.S. PATENT DOCUMENTS

| | | | |
|---|---|---|---|
| 4,635,421 | 1/1987 | Newberg. | |
| 4,643,787 | 2/1987 | Goodman | 52/809 X |
| 4,720,951 | 1/1988 | Thorn et al. . | |
| 4,724,115 | 2/1988 | Freeman. | |
| 4,746,383 | 5/1988 | Bacon et al. . | |
| 4,811,538 | 3/1989 | Lehnert et al. . | |
| 4,860,512 | 8/1989 | Thorn. | |
| 4,864,789 | 9/1989 | Thorn. | |
| 4,901,493 | 2/1990 | Thorn. | |
| 4,922,674 | 5/1990 | Thorn. | |
| 4,965,030 | 10/1990 | Thorn. | |
| 5,020,292 | 6/1991 | Strom et al. | 52/309.9 |
| 5,034,178 | 7/1991 | Kinugasa et al. | 264/510 |
| 5,074,087 | 12/1991 | Green | 52/309.9 |
| 5,075,059 | 12/1991 | Green | 264/129 |
| 5,095,675 | 3/1992 | Audia | 52/309.9 X |
| 5,142,835 | 9/1992 | Mrocca | 52/309.9 X |
| 5,239,799 | 8/1993 | Bies et al. | 52/309.11 |

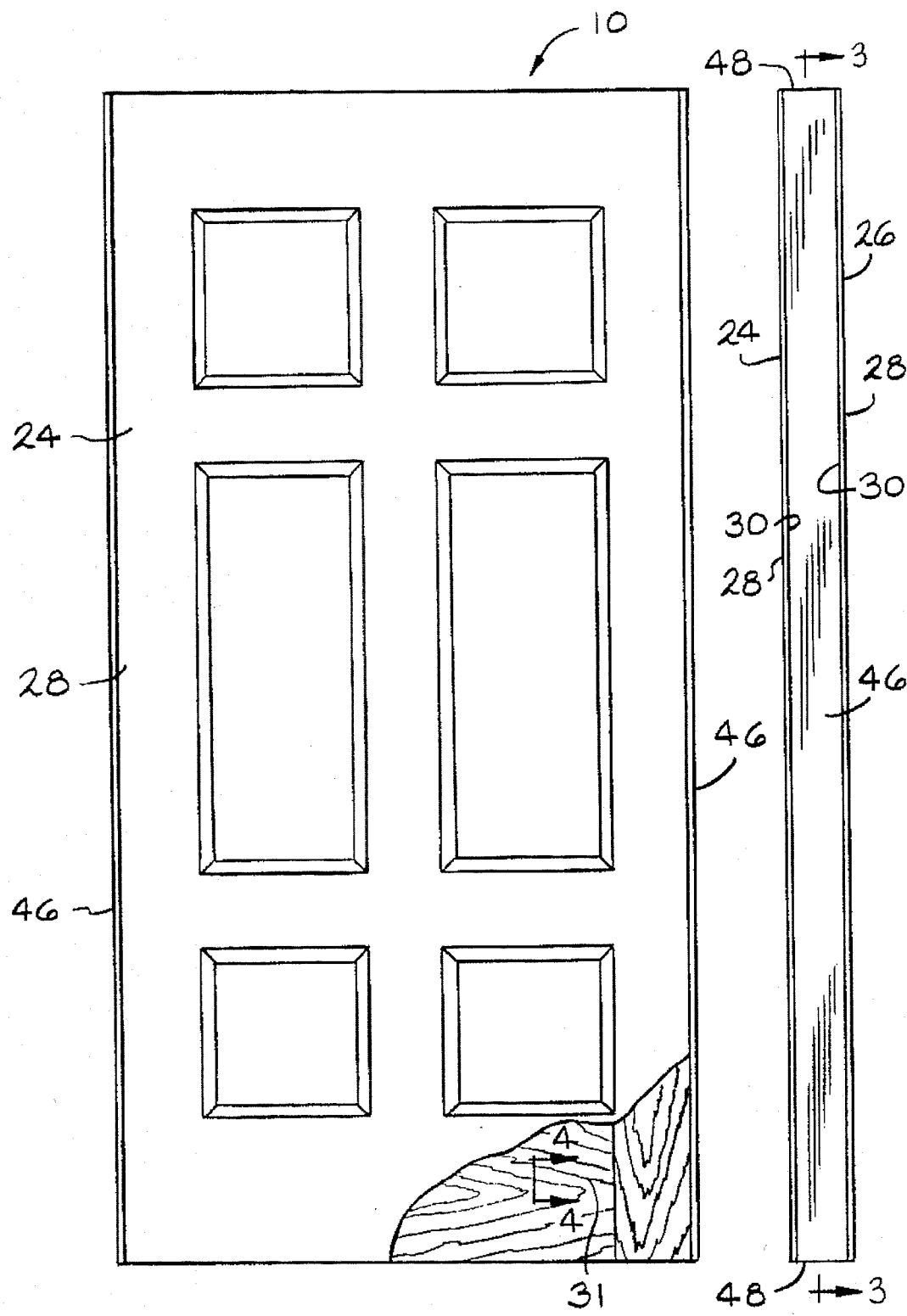

COMPRESSION MOLDED DOOR ASSEMBLY

BACKGROUND OF THE INVENTION

The present invention is directed to a door assembly. More specifically, the invention is directed to a door assembly having molded door skins that include a textured pattern that simulates the grain of natural wood.

Wood as a building material has advantages and disadvantages. The advantages of wood include an appealing appearance due to the annual variations, color and width of bands resulting from the growth of the wood. In addition, the cells in the wood provide porosity that can absorb stain. The disadvantages of wood are many. For example, wood can experience significant dimensional changes with variations in temperature and humidity. This can result in cracking and splitting. Further, the natural growth of wood can result in aesthetic and mechanical flaws from such occurrences as sap pockets and knots. Therefore, there is a need for a door assembly that has the appearance and stainability of wood with superior mechanical properties.

Door assemblies made of compression molded door skins are known in the art. These door assemblies provide uniform and reproducible products that can be aesthetically pleasing. An example of a prior art door assembly is shown in U.S. Pat. No. 4,550,540. It has been found that prior art doors contain imperfections that are recognized by knowledgeable consumers and persons involved in the door industry. For example, the surface of prior art door skins is not sufficiently rough at a microscale, the range of depth of the grain is too narrow, the grain pattern does not include undercuts and angle changes, the door assemblies are substantially lighter than wood doors, the prior art door assemblies flex more than wood doors, and the prior art doors can warp from the differences in skin surface temperature between the two opposed door skins. Therefore, there is a need for a door assembly that overcomes these problems.

SUMMARY OF THE INVENTION

The present invention is directed to a door assembly having an inserted core or a core formed in-situ positioned within a frame. A pair of opposed molded skins are attached to the frame. There are edges adjacent the skins. The skins are made of a polymer material, a low profile additive and reinforcement fibers. Each of the skins has an exterior surface and an interior surface. The interior surface is adjacent the core. The exterior surface includes a textured pattern consisting of level portions and depressions. The depressions have a range in depth from about 0.025 mm to about 1.0 mm from the level portions. The skins further include undercuts adjacent the depressions. The undercuts have a range in extent of undercutting from about 0.025 mm to about 0.10 mm from the depressions.

It is the primary object of the present invention to provide a door assembly that has the appearance of natural wood.

It is an important object of the invention to provide a door assembly that has superior mechanical properties.

It is another important object of the invention to provide a door assembly that is stainable, Other objects and advantages of the invention shall become apparent upon a review of description of the preferred embodiment and the accompanying drawings.

DESCRIPTION OF THE DRAWINGS

FIG. 1 is a front elevational view of a door assembly according to the present invention;

FIG. 2 is a side elevational view of the door assembly of the present invention;

DETAILED DESCRIPTION OF THE PREFERRED EMBODIMENT

Figure 3:
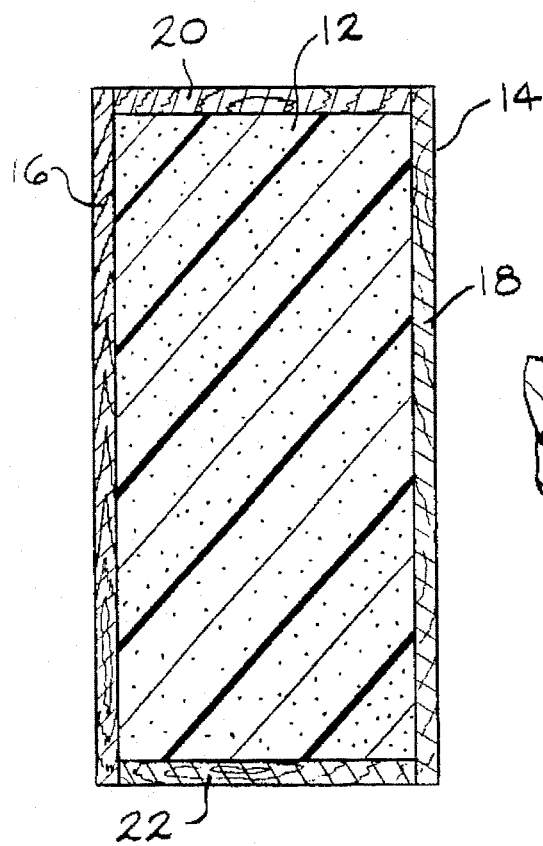
FIG. 3 is a cross-sectional view taken along line 3—3 of FIG. 2 showing the frame of the present invention with the core positioned therein.

The present invention will now be described in detail with reference being made to the accompanying drawings. The door assembly of the present invention is indicated generally by the reference number 10. Referring to FIGS. 1,2 and 3, the door assembly 10 includes a core 12 positioned within a frame 14. The core 12 can be an inserted core or a core formed in-situ. The core 12 can be made of a variety of materials depending on the application. For example, inserted cores can include continuous or discontinuous compressed mineral board, compressed inorganic fillers with binders, compressed organic fillers with binders, compressed organic and inorganic blends with binders or in-situ formed binder; molded or shaped thermoplastics such as expanded polystyrene, foamed polyvinyl chloride, or foamed or expanded polyolefins; molded or shaped thermosets such as flexible or rigid, solid or foamed polyurethanes, polyurea-urethanes, polyureas, polyisocyanurates, and phenolics; blow molded shells; or honeycomb inserts comprised of organic fibers, organic pulps, thermoplastics, and thermosets; preforms derived from either air-laid or vacuum-laid mats of cellulosic fiber, glass fiber, thermoplastic fiber, or thermoset fiber or woven mats or veil of the same materials where a binder or resin has been applied or injected to shape a core; and blends or mixtures of these various types of insertable cores. In-situ formed cores include cores developed from reaction injection molding with or without reinforcement of thermosets such as polyurethanes, polyurea-urethanes, polyisocyanurates, and phenolics; gas injection of a thermoplastic, ceramic, or thermoset; activation of in-situ blowing agents or foaming of material introduced into the shell; mechanical tension applied to melted or softened thermoplastic or thermoset materials; or blends and combinations of these in-situ cores. The choice of a core material is constrained by ±10% dimensional change in the range of −40° C. to 95° C. with ±5% preferred.

As shown in FIG. 3, the frame 14 includes a first stile 16 and a second stile 18. The stiles 16 and 18 are parallel to one another. The stiles 16 and 18 are positioned in a perpendicular relationship to a first rail 20 and a second rail 22. The frame in FIG. 3 has a rectangular geometric configuration. However, it should be understood that the frame can be arranged in a variety of geometric configurations depending upon the application. The stiles and rails can be made of wood or some other suitable material. In the present embodiment, the first stile 16 is manufactured to add weight to the stile. The stile 16 can be made of material strips attached or independent from the core 12 that are formed from a plurality of layers of sheet material. The sheet material can be cellulosic veneers and plies or compressed slurry of cellulosic fibers. The stile 16 when positioned at the outer edge of the pivot away from the hinges provides the door assembly 10 with a closing momentum which makes a person closing the door to believe the door to be substantial or "solid". The stile 16 has a width in the range of from about 2.5 cm to 16 cm. The stile 16 can also be a hollow channel of pultruded or extruded reinforced plastic, a metal hollow channel, a partially or totally metal reinforced channel made of a material other than metal, or a compressed mineral stile depending on the application.

As shown in FIGS. 1 and 2, the door assembly 10 includes a first molded skin 24 and an opposed second molded skin 26. The texture of skins 24 and 26 can be made by a variety of casting and deposition processes. These casting processes include silicone molds, epoxy molds, metal molds from sandcasting, metallic shell on a mandrel, electroless metallic disposition on a mandrel and cold isostatic pressing using any of the above texture transfer techniques to create the textured surface for the mandrel. The skins 24 and 26 can be formed with the texture by many molding techniques including resin transfer molding, vacuum assisted resin intrusion, rotational molding, low and high pressure injection molding, as well as low and high pressure compression molding.

In the preferred embodiment, the skins 24 and 26 are compression molded door skins that are prepared from a Low Coefficient of Linear Thermal Expansion (LCLTE) material such as a modified unsaturated polyester sheet molding compound that is doped with 0.25–20 weight percent of an immiscible phase of a low profile additive. The unsaturated polyester sheet molding compound is formed by a condensation polymerization using polyols including ethylene glycol, propylene glycol, neopentyl glycol, diethylene glycol, dipropylene glycol, trimethylpentanediol, cyclohexane diol, propoxylated bisphenol A, hydrogenated bisphenol A, dibromoneopentyl glycol and blends thereof. The acids or anhydrides used in the polymerization may include the following as well as any dimers and blends thereof: phthalic anhydride, maleic anhydride, adipic acid, isophthalic acid, orthophthalic acid, terephthalic acid, fumaric acid, glutaric acid, azelaic acids, chlorendic acid, tetrabromophthalic anhydride, tetrachlorophthalic acid, and endomethylenetetrahydrophthalic anhydride. The low profile additive can be selected from any of the following blends thereof: polymethylmethacrylate, polymethylmethacrylate co-polymers with other acrylates, polystyrene, polystyrene copolymers, polyvinyl acetate, polyethylene, saturated polyesters, and shrinkage control agents. The saturated polyesters and shrinkage control agents include vinyl chloride-vinyl acetate copolymers, polyurethanes, styrene butadiene copolymers, polycaprolactone, and cellulose acetate butyrate. The low profile additives can be added directly to the formulation or they can be applied or incorporated onto a carrier material such as a filler. The molding compound can be reinforced with, for example, fiber glass, aramid fibers, carbon fibers, or mineral reinforcements such as mica. Other polymer materials that can be used include bulk (or dough) molding compound, kneading molding compound, an injection molding compound known as ZMC, and thick molding compound.

An example of a preferred formulation of the LCLTE sheet molding compound that can be used to make the molded skins of the present invention is as follows:

EXAMPLE

| Material | Parts Per Hundred Resin |
|---|---|
| Unsaturated polyester: Acid modified propylene glycol maleate | 80–50 |
| Low Profile Additive Polyvinyl acetate | 20–50 |
| Condensation Reaction Catalyst | 0.75–2.5 |
| Filler | 130–250 |
| Pigment | 3–15 |
| Mold Release | 4–9 |
| Chemical Thickener | 1.5–3.5 |
| Chopped Fiberglass Reinforcement | 15–35 |

As shown in FIGS. 1 and 2, the skins 24 and 26, each has an exterior surface 28 and an interior surface 30. The interior surface 30 is adjacent the core 12. The interior surface 30 can show machining marks to the unaided eye (rough machined) or be textured. The interior surface 30 can also include mechanical means, such as projections, to assist in the adherence of the skins to the core (not shown).

Figure 4:
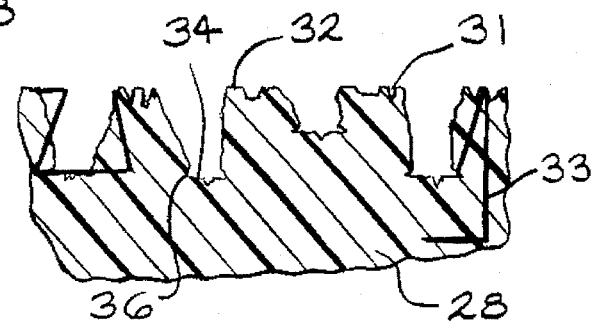
FIG. 4 is a partial cross-sectional view taken along line 4—4 of FIG. 1 showing a door skin of the present invention having level portions, depressions, and undercuts.
Figure 5:
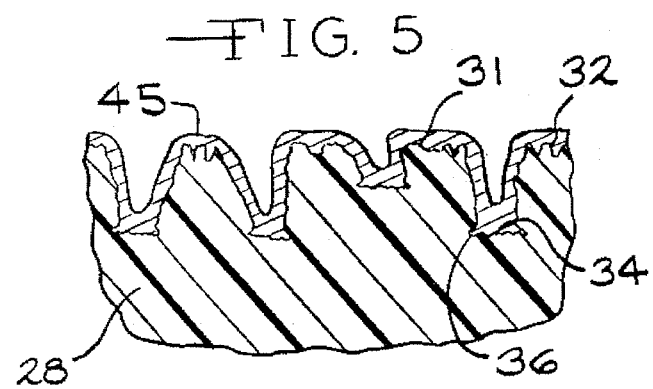
FIG. 5 is a view similar to FIG. 4 showing a topcoat applied to the door skin; and, FIG. 6 is a partial cross-sectional view showing the molding of a door skin used in the door assembly of the present invention.

As shown in FIGS. 1, 4 and 5, the exterior surface 28 of a skin includes a textured pattern 31 consisting of level portions 32 and depressions 34. The textured portion simulates a natural woodgrain pattern. As used herein, the term "level portion" means the outermost planar surface of the door skin. The term "depression" means any deviation from the level portions. In the present embodiment, the depressions 34 can have a depth from about 0.025 mm to about 1.0 mm from said level portions 32, with the preferred range being from about 0.025 mm to about 0.40 mm. As shown in FIG. 4, the exterior surface 28 includes numerous depressions. The depressions 34 can be defined in the skins by various obtuse and acute angles to simulate how grain is defined in natural wood. The exterior surface 28 further includes undercuts 36. The extent of the undercuts 36 varies with the rigidity of the skins at the time of demolding. The rigidity of the skins are dependent on the molding process and materials used and other variables such as time, temperature, and depth of the undercut from the surface. It has been found that LCLTE material provides sufficient partially-cured, hot, green strength of the skins during the molding process to allow relatively deep undercuts. The combination of material shrinkage and the proportional limit of the material while hot and partially cured determine the extent to which undercuts are feasible. The best production method to assess the compatibility of the material composition with the mold undercut design is a use test. To achieve this in the preferred embodiment, the material must be designed to have about the first 2.5% of elongation governed by resin properties, with stiffness after that governed by the reinforcements. The preferred Coefficients of Linear Thermal Expansions (CLTE) are listed in the following table:

TABLE

| | 90 Degrees C. mm/mm/C | 23 Degrees C. mm/mm/C |
|---|---|---|
| CLTE | $0–8.3 \times 10^{-6}$ | $0–7.2 \times 10^{-6}$ |
| preferred | $4–7 \times 10^{-6}$ | $3–6 \times 10^{-6}$ |

Figure 6:
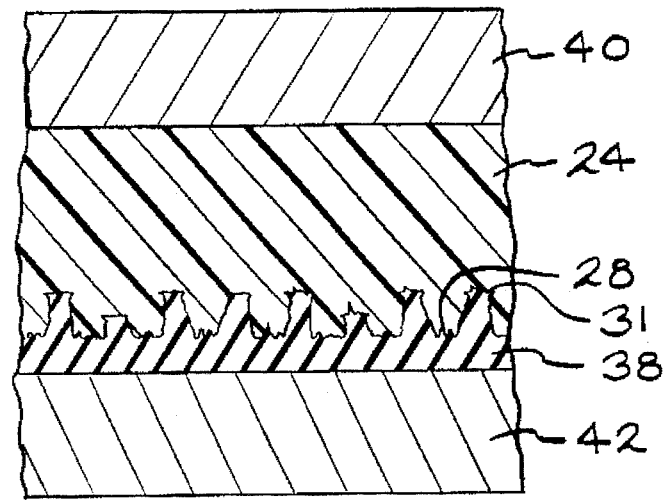

In the preferred embodiment, the undercuts 36 range from about 0.025 mm to about 0.10 mm as measured from the depressions 34. As shown in FIG. 6, a skin 24 can be compression molded using a mold form 38 and first and second mold backing plates 40 and 42, respectively. The mold form 38 includes a textured pattern 31 that is mirrored by the exterior surface 28 of the skin 24. As shown in FIG. 4, the upraised features 33 of the textured pattern 31 can have a height to base ratio of as much as 4 and survive intact over 3000 reproductions in pressure ranges from 21 to 315 kg/cm² with few changes noticeable to the unaided eye. The number of reproductions will vary significantly depending on many variables including reinforcement content of the reproduction formula, the pressures of the molding, and the materials used in the molding process. In the preferred embodiment, the skins 24 and 26 are compression molded at compression pressures ranging between 21 to 315 kg/cm². The skins 24 and 26 can be molded to a thickness in the range of from about 0.125 cm to about 3.0 cm.

As shown in FIG. 5, the textured pattern 31 created by the level portions 32, depressions 34 and undercuts 36 allow for the application of a topcoat 45, such as stains and paints, to be applied to the skin. The textured pattern 31 provides a rough surface that resists the movement of the topcoat 45 like a wood door as it is brushed or otherwise applied to the skin 24. The increased depth of the depressions 34 also allows for the wipe-on/wipe-off application of stains having low pigment contents. The product can be used with stains having a pigment loading of 4–70 weight percent, with the preferred range being 15–25 weight percent. It has been found in prior art compression molded door assemblies that stains with pigment loadings less than about 15 weight percent did not trap sufficient pigment in the texturing to highlight the texture in most applications. In addition, in the prior art assemblies the preferred stain application was by hand-rubbing accompanied by brushing. These are not the traditional methods of professional painters and stainers.

Referring to FIG. 2, the door assembly 10 includes vertical edges 46 and horizontal edges 48. The edges are adjacent and substantially perpendicular to the skins 24 and 26.

Referring to FIGS. 1 and 3, the door skins 24 and 26 can be larger than the frame 14. This allows for the door to be cut squarely, rebated or beveled as required by the user of the door assembly 10. The edges 46 and 48 can also include weatherstrip members (not shown).

The above detailed description of the present invention is given for explanatory purposes. It will be apparent to those skilled in the art that numerous changes and modifications can be made to the invention described above without departing from the scope of the invention. Accordingly, the whole of the foregoing description is to be construed in an illustrative and not a limitative sense, the scope of the invention being defined solely by the appended claims.

We claim:

1. A door assembly comprising, in combination, a core positioned within a frame, a pair of opposed molded skins attached to said frame, edges adjacent said skins, said skins consisting of a polymer material, a low profile additive and reinforcement means, each of said skins having an exterior surface and an interior surface, said interior surface being adjacent said core, said exterior surface including a textured pattern consisting of level portions and depressions, said depressions having a range in depth from about 0.025 mm to about 1.0 mm from said level portions, said skins further including designed variable undercuts adjacent said depressions, said undercuts having a predetermined range in extent of undercutting from about 0.025 mm to about 0.10 mm from said depressions, whereby said door assembly has a simulated wood grain.

2. The door assembly of claim 1, wherein said core consists of a foamed material.

3. The door assembly of claim 1, wherein said frame includes two parallel stiles and two parallel rails, said stiles being positioned in perpendicular relationship to said stiles.

4. The door assembly of claim 3, wherein one of said stiles is heavier than the other said stile.

5. The door assembly of claim 1, wherein said polymer material is selected from the group consisting of sheet molding compound, bulk molding compound, thick molding compound, kneading molding compound, and injection molding compound.

6. The door assembly of claim 1, wherein said polymer material is an acid-modified propylene glycol maleate.

7. The door assembly of claim 1, wherein said low profile additive is selected from the group consisting of polymethylmethacrylate, polymethylmethacrylate copolymers, polystyrene, polystyrene copolymers, polyvinyl acetate, polyethylene and saturated polyesters.

8. The door assembly of claim 7, wherein said low profile additive is added directly to said polymer material.

9. The door assembly of claim 7, wherein said low profile additive is added to said polymer material by combination with a carrier material.

10. The door assembly of claim 7, wherein a shrinkage control agent is added to said low profile additive.

11. The door assembly of claim 1, wherein said reinforcement means is selected from the group consisting of fiberglass, aramid fibers, carbon fibers, and mineral reinforcements.

12. The door assembly of claim 1, wherein said depressions have nonuniform depths ranging from about 0.025 mm to about 1.0 mm.

13. The door assembly of claim 1, wherein said undercuts have nonuniform extents of undercutting ranging from about 0.025 mm to about 0.10 mm.

14. The door assembly of claim 1, wherein said depressions and undercuts receive a topcoat.

15. The door assembly of claim 14, wherein said topcoat is a stain having pigment contents of from about 4 to about 70 weight percent.

\* \* \* \* \*